(No Model.)
E. W. ROSS.
BAND OR FLY WHEEL.
No. 255,196. Patented Mar. 21, 1882.
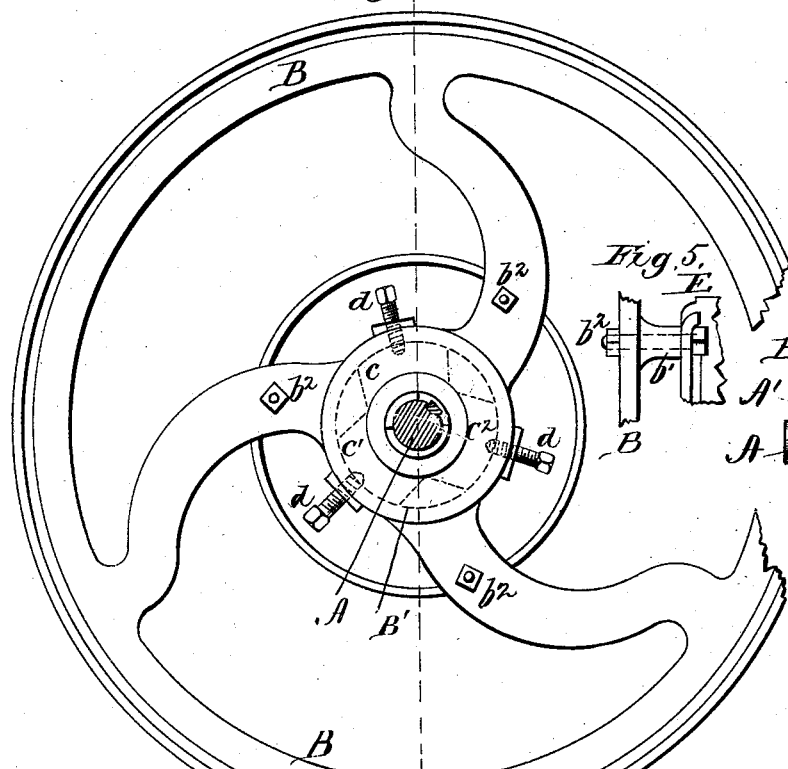
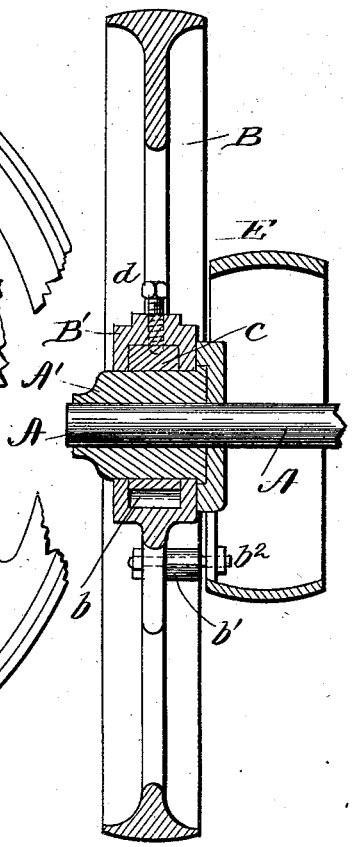
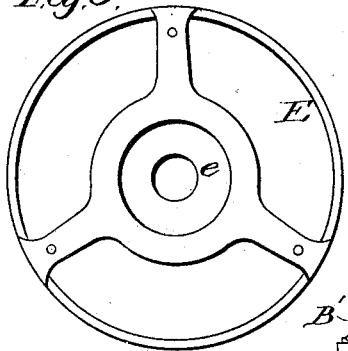
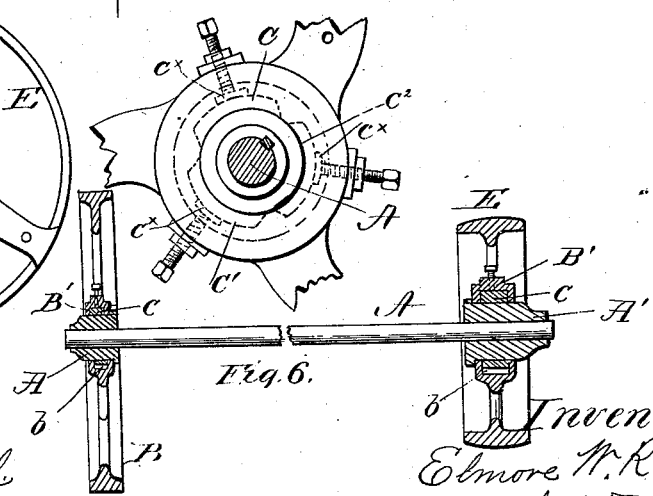
Witnesses
F. L. Ouraud
R. W. Smith
Inventor:
Elmore W. Ross
by A. M. Smith
Attorney

UNITED STATES PATENT OFFICE.

ELMORE W. ROSS, OF FULTON, NEW YORK.

BAND OR FLY WHEEL.

SPECIFICATION forming part of Letters Patent No. 255,196, dated March 21, 1882.

Application filed January 27, 1882. (No model.)

*To all whom it may concern:*

Be it known that I, ELMORE W. ROSS, of Fulton, county of Oswego, State of New York, have invented new and useful Improvements in Safety Band or Fly Wheels, of which the following is a full, clear, and exact description, reference being had to the accompanying drawings, making part of this specification, in which—

Figure 1 is a side elevation, partly broken away, of my improved band and fly wheels united. Fig. 2 is a section through the same, taken on the dotted line in Fig. 1. Fig. 3 is a side elevation of the band-wheel detached from the fly-wheel. Fig. 4 is a partial side elevation, showing a modification in the manner of securing the fly-wheel to its shaft. Fig. 5 shows the manner of uniting the wheels; and Fig. 6 is a section on the line of the shaft, showing the band and fly wheels separated and attached to opposite ends of or at different points on the shaft.

My invention relates to a novel manner of attaching band and fly wheels to a driving-shaft, whereby they are adapted to release themselves in the event of a sudden stoppage of the machinery driven by said shaft, and of the shaft itself, consequent upon such stoppage of the machinery, for the purpose of relieving the shaft of the driving force and momentum of said wheels and permitting them to expend their momentum without danger of injury to the other parts; and it consists in uniting said wheels, either or both, to their shaft by means of friction-gibs, which in the event of a sudden stoppage of the actuated mechanism serve to release said wheels from the shaft, allowing the latter to stop while the wheels continue to revolve, as hereinafter explained.

In the accompanying drawings, A represents a shaft, to which the band and fly wheels are attached, and from which motion is imparted to any desired mechanism—such, for example, as agricultural and fiber-cutting machinery—where the machinery is liable to be suddenly stopped by the admission with the material being operated upon of sticks, stones, or other foreign obstructing matter, such as would endanger the breaking of the cutters or other parts of the machinery, as well as the safety of the attendant, from the broken and flying parts.

B is the fly-wheel, provided with a hub, B', provided with an annular groove, $b$, on its inner face, for the reception of the friction-gibs $c\, c'\, c^2$. The outer faces of these gibs have small sockets formed in them for the reception of the pointed end of the set-screws $d$, passing through the wall of the hub, and by means of which the gibs can be held up to and made to grasp the shaft A with any required force. Instead of acting directly on the shaft, the latter may have a sleeve or hub, A', keyed to it, enlarging it and the perforation in the hub of the wheel, and thereby giving the gibs increased bearing-surface, increasing their efficiency.

In Fig. 4 the screws, instead of being pointed and resting in sockets, are shown as having their ends made flat and resting on small bosses $c^\times$ on the gibs, from which they slip in the event of a sudden stoppage of the shaft A and of the mechanism actuated by it, thus relieving the fly-wheel and leaving it free to expend its momentum without exerting it to drive the shaft, and in both constructions it will be seen that the wheel is held to the shaft by the frictional grasp of the gibs, which may be regulated at will by the adjustment of the set-screws $d$.

E is the band or driving wheel shown in Figs. 1 and 2, secured to the shaft A through the fly-wheel B in such manner that when the latter is released from its shaft, as above explained, the band-wheel will also be released from said shaft.

Fig. 3 shows the side of the band-wheel adjacent to the fly-wheel, its hub being recessed at $e$ to fit over the end of sleeve A', and bolts $b^2$, passing through the arms of the wheels B and E, as shown in Figs. 2 and 5, serve to unite the two, the arrangement being such that a single set of gibs serves to unite both wheels to the shaft A, and the release of one from said shaft serves to release both. The band and fly wheel may, however, be placed at opposite ends or at different points of the shaft, as the character of the work to be done or of the machinery operated thereby may require. In this case each wheel will be required to be provided with its own retaining-gibs, as shown in Fig. 5, the arrangement in each case being similar to that described above in connection with the fly-wheel.

The arms of the fly-wheel are shown provided with laterally-projecting sleeves $b'$, through which the bolts $b^2$ pass, which unite the band-wheel to the fly-wheel, the arms of the band-wheel resting on the outer ends of said sleeves, as shown in Figs. 2 and 5.

The safety fly and band wheels above described are designed more especially for use in agricultural and fiber-cutting machines, such as are liable to be suddenly stopped by the introduction of sticks, stones, or other obstructing matter, and where, unless provision were made for instant relief from the driving force and momentum of the band and fly wheel, there would be danger not only of serious injury to the machinery, but also to the attendant, in consequence of the breakage of the machinery, and the violence with which the broken parts would be thrown. It will be apparent, however, that they may be used wherever safety band and fly wheels are found to be desirable.

By adjusting the set-screws $a$ the gibs may be made to grasp the shaft with less or greater tenacity, adapting them to the work required of them in such manner that any obstruction interposing a resistance greater than that which they were adjusted to overcome will serve to release the band and fly wheel and permit the shaft to stop until the obstruction is removed, the wheels continuing to revolve until their momentum is expended, after which the gibs and set-screws can be readjusted, and the operation of the machinery resumed.

Having now described my invention, I claim as new—

1. The band or fly wheel provided with the annular groove on the inner face of its hub, in combination with the friction-gibs moving radially in said groove and the set-screws for uniting the wheel to its shaft, said parts being arranged and operating substantially as described.

2. The band or fly wheel provided with the annularly-grooved hub, in combination with the radially-moving friction-gibs arranged therein, and provided with the bosses on their outer faces and the flat-ended set-screws for uniting said wheel to its shaft with a frictional grasp, said parts being arranged and operating substantially as described.

In testimony whereof I have hereunto set my hand this 9th day of January, A. D. 1882.

ELMORE W. ROSS.

Witnesses:
JAY CLARENCE DOWNER,
CLINTON H. CRONYN.